(12) United States Patent
Yamamoto

(10) Patent No.: US 9,080,853 B2
(45) Date of Patent: Jul. 14, 2015

(54) EYEGLASS FRAME SHAPE MEASURING APPARATUS

(71) Applicant: NIDEK CO., LTD., Gamagori, Aichi (JP)

(72) Inventor: Takayasu Yamamoto, Toyokawa (JP)

(73) Assignee: NIDEK CO., LTD., Aichi (JP)

( * ) Notice: Subject to any disclaimer, the term of this patent is extended or adjusted under 35 U.S.C. 154(b) by 129 days.

(21) Appl. No.: 14/017,755

(22) Filed: Sep. 4, 2013

(65) Prior Publication Data
US 2014/0059871 A1 Mar. 6, 2014

(30) Foreign Application Priority Data
Sep. 5, 2012 (JP) ................................ 2012-195457

(51) Int. Cl.
*G01B 5/20* (2006.01)
*B24B 9/14* (2006.01)
*G02C 13/00* (2006.01)

(52) U.S. Cl.
CPC . *G01B 5/20* (2013.01); *B24B 9/144* (2013.01); *G02C 13/003* (2013.01)

(58) Field of Classification Search
CPC ........ B24B 9/144; G01B 5/20; G02C 13/003; G01C 13/005
USPC ................................................... 33/200, 507
See application file for complete search history.

(56) References Cited

U.S. PATENT DOCUMENTS

| | | | | |
|---|---|---|---|---|
| 5,121,550 | A * | 6/1992 | Wood et al. | 33/200 |
| 5,333,412 | A * | 8/1994 | Matsuyama | 451/5 |
| 6,325,700 | B1 | 12/2001 | Mizuno et al. | |
| 7,571,545 | B2 | 8/2009 | Nauche et al. | |
| 7,681,321 | B2 | 3/2010 | Shibata | |
| 8,015,716 | B2 | 9/2011 | Matsuyama | |
| 2008/0289200 | A1* | 11/2008 | Jouard | 33/200 |
| 2009/0007444 | A1* | 1/2009 | Shibata | 33/200 |
| 2010/0094589 | A1 | 4/2010 | Tesseraud | |
| 2011/0131822 | A1 | 6/2011 | Matsuyama | |
| 2011/0149234 | A1* | 6/2011 | Biton et al. | 351/177 |
| 2014/0340633 | A1* | 11/2014 | Luc et al. | 351/159.73 |
| 2014/0373368 | A1* | 12/2014 | Shibata et al. | 33/200 |

FOREIGN PATENT DOCUMENTS

| | | |
|---|---|---|
| EP | 2012085 A1 | 1/2009 |
| FR | 2934903 A1 | 2/2010 |

(Continued)

OTHER PUBLICATIONS

Office Action dated Oct. 25, 2013 issued by the European Patent Office in counterpart European Patent Application No. 13183074.7.

*Primary Examiner* — G. Bradley Bennett
(74) *Attorney, Agent, or Firm* — Sughrue Mion, PLLC

(57) ABSTRACT

An eyeglass frame shape measuring apparatus includes: a frame holding unit holding an eyeglass frame; a tracing stylus inserted into a bevel groove of the rim; a moving unit moving the tracing stylus; and a controller controls the moving unit and obtains measurement data of a shape of the rim. The controller controls the moving unit based on a first measurement operation to perform a first measurement. The controller decides whether the first measurement is performed in a first state in which the tracing stylus is inserted into the bevel groove at the time of starting the first measurement or a second state in which the tracing stylus is not inserted into the bevel groove at the time of starting the first measurement. If the controller decides that it is the second state, the controller performs a second measurement based on a second measurement operation.

11 Claims, 7 Drawing Sheets

(56) References Cited

FOREIGN PATENT DOCUMENTS

| JP | 2000-314617 A | 11/2000 |
| JP | 2006-350264 A | 12/2006 |
| JP | 2009-14517 A | 1/2009 |
| JP | 2011-122898 A | 6/2011 |
| JP | 2011-122899 A | 6/2011 |

* cited by examiner

EYEGLASS FRAME SHAPE MEASURING APPARATUS

CROSS REFERENCE TO RELATED APPLICATION

This application is based upon and claims the benefit of priority of Japanese Patent Application No. 2012-195457 filed on Sep. 5, 2012, the contents of which are incorporated herein by reference in its entirety.

BACKGROUND

The present invention relates to an eyeglass frame shape measuring apparatus to measure (trace) a shape of a rim of an eyeglass frame.

There is known an eyeglass frame shape measuring apparatus that includes a frame holding mechanism which holds left and right rims (lens frames) of an eyeglass frame in the desired state, and a measurement mechanism (tracing mechanism) to obtain a three-dimensional shape of the rim by moving a tracing stylus, which is inserted into a groove (bevel groove) of the rim, along the bevel groove of the rim, and detecting a movement position of the tracing stylus in a radial direction and a direction vertical to a radial direction of the rim (for example, JP-A-2000-314617 and JP-A-2011-122899). The frame holding mechanism includes a clamping mechanism which is disposed on a front side and a rear side of the rim to clamp the rim with two clamping pins. When the tracing stylus is inserted into the groove of the rim, the tracing stylus is generally positioned in the center of the two clamping pins in a direction vertical to the radius vector such that the tracing stylus is positioned in the center of a front-to-rear width (front side and rear side) of the rim. Then, the tracing stylus is inserted into the bevel groove by moving the tracing stylus to the rim side.

SUMMARY

In recent years, high-curve frames of which rims are highly curved along the ear side are increasingly used. In the high-curve frame, a bevel groove is sometimes formed to be deviated to the front side of the rim rather than to be in the center of a front-to-rear width thereof. In the aforementioned rim, a tracing stylus is not inserted into the bevel groove when starting measurement, thereby causing a measurement failure. In this case, an operator visually checks positional relationship between the bevel groove and the tracing stylus, and performs an action to insert the tracing stylus into the bevel groove with fingers. Thereafter, the operator takes a step to start the measurement of the rim such that assistance of the operator is necessary. In a case of measuring one of left and right rims, and then measuring the other one of the rims, the assistance of the operator is necessary in the same manner. Accordingly, there are problems in that effort of the operator and a long time period in the measurement are required.

In consideration of the above-mentioned problems of the related art, a technical object of the present invention is to provide an eyeglass frame shape measuring apparatus which reduces the assistance of the operator as much as possible to be able to achieve efficiency of the measurement.

(1) An eyeglass frame shape measuring apparatus comprising:
a frame holding unit configured to hold a rim of an eyeglass frame;
a tracing stylus configured to be inserted into a bevel groove of the rim;
a moving unit configured to move the tracing stylus;
a detector configured to detect a position of the tracing stylus; and
a controller configured to control the moving unit and obtain measurement data of a shape of the rim based on the detection result by the detector,
wherein the controller controls the moving unit based on a first measurement operation to perform a first measurement,
wherein the controller decides, based on a change in the measurement data obtained by moving the tracing stylus from a measurement starting point of the rim at the first measurement, whether the first measurement is performed in a first state in which the tracing stylus is inserted into the bevel groove of the rim at the time of starting the first measurement or a second state in which the tracing stylus is not inserted into the bevel groove of the rim at the time of starting the first measurement, and
wherein if the controller decides that the first measurement is performed in the second state, the controller performs a second measurement based on a second measurement operation which is at least partially different from the first measurement operation.

(2) The eyeglass frame shape measuring apparatus according to (1), wherein
in the second measurement, the controller decides, based on the change in the obtained measurement data, whether or not the tracing stylus is inserted into the bevel groove during the movement of the tracing stylus, and the controller controls the moving unit to move the tracing stylus from a position of the rim where the controller decides that the tracing stylus is inserted into the bevel groove and obtains the measurement data of a whole circumference of the rim.

(3) The eyeglass frame shape measurement apparatus according to (1) further comprising:
a measurement starting signal input unit configured to input a starting signal for consecutive measurement to consecutively measure a first rim which is one of left and right rims, and then a second rim which is the other one of the left and right rims; and
a memory for storing the measurement data of the rim,
wherein, when the starting signal for consecutive measurement is input, after the measurement of the first rim, the controller determines a position of the tracing stylus in a front-and-rear direction of the rim when the tracing stylus is moved from an initial position to a measurement starting point of the second rim based on the measurement data of the first rim stored in the memory, and starts measuring the second rim by moving the tracing stylus to the determined position.

(4) The eyeglass frame shape measurement apparatus according to (1), wherein in the second measurement, the controller controls the moving unit to separate the tracing stylus from the rim, then bring the tracing stylus into contact with a substantially center position of the rim in a front-to-rear width of the rim, and move the tracing stylus in an ear side direction of the rim while the contact position of tracing stylus with respect to the rim in the front-to-rear with of the rim is substantially kept.

(5) The eyeglass frame shape measurement apparatus according to (1), wherein in the second measurement, the controller controls the moving unit to separate the tracing stylus from the rim, then bring the tracing stylus into contact with a substantially center position of the rim in a front-to-rear width of the rim, and move the tracing stylus in an ear side direction of the rim while the tracing stylus in a front direction of the rim is moved.

(6) The eyeglass frame shape measurement apparatus according to (1), wherein in the second measurement, the controller controls the moving unit to separate the tracing stylus from the rim, and then bring the tracing stylus into contact with a position of the rim which is located at a front side than a center position of the rim in a front-to-rear width of the rim.

(7) The eyeglass frame shape measurement apparatus according to (1), wherein the controller controls the moving unit to move the tracing stylus, which is positioned at an initial position, toward the rim held by the frame holding unit, and bring the tracing stylus into contact with a substantially center position of the rim in a front-to-rear width of the rim, and if the controller decides that the first measurement is performed in the first state, the controller controls the moving unit so as to obtain the measurement data of the whole circumference of the rim from the measurement starting point.

(8) The eyeglass frame shape measurement apparatus according to (7), wherein the moving unit includes a moving force applying unit configured to apply moving force for causing the tracing stylus, which contacts the rim, toward a rear direction of the rim, if the controller decides that the first measurement is performed in the second state, the controller:

controls the moving unit to separate the tracing stylus from the rim and bring the tracing stylus into contact with the substantially center position of the rim, and move the tracing stylus in an ear side direction of the rim in a state that the contact position of tracing stylus with respect to the rim in the front-to-rear with of the rim is substantially kept;

decides, based on the change in the obtained measurement data, whether the tracing stylus is inserted into the bevel groove during the movement of the tracing stylus;

controls the moving unit to move the tracing stylus along the bevel groove from a position where the controller decides that the tracing stylus is inserted into the bevel groove; and obtains the measurement data of a whole circumference of the rim.

(9) The eyeglass frame shape measurement apparatus according to (7), wherein the moving unit includes a moving force applying unit configured to apply moving force for causing the tracing stylus, which contacts the rim, toward a rear direction of the rim, if the control unit decides that the first measurement is performed in the second state, the control unit:

controls the moving unit to separate the tracing stylus from the rim and bring the tracing stylus into contact with the substantially center position of the rim, and move the tracing stylus in an ear side direction of the rim while moving the tracing stylus in a front direction of the rim;

decides, based on the change in the obtained measurement data, whether the tracing stylus is inserted into the bevel groove during the movement of the tracing stylus;

controls the moving unit to move the tracing stylus along the bevel groove from a position where the controller decides that the tracing stylus is inserted into the bevel groove; and obtains the measurement data of a whole circumference of the rim.

(10) The eyeglass frame shape measurement apparatus according to (7), wherein the moving unit includes a moving force applying unit configured to apply moving force for causing the tracing stylus, which contacts the rim, toward a rear direction of the rim, if the controller decides that the first measurement is performed in the second state, the controller:

decides whether the tracing stylus is inserted into the bevel groove during the movement of the tracing stylus based on the change in the obtained measurement data; and controls the moving unit to move the tracing stylus along the bevel groove from a position where the controller decides that the tracing stylus is inserted into the bevel groove; and obtains the measurement data of a whole circumference of the rim.

(11) The eyeglass frame shape measuring apparatus according to (7), wherein the frame holding unit includes two clamp pins arranged to clamp front and rear sides of the rim, and the controller controls the moving unit to bring the tracing stylus to a substantially center position between the two clamp pins to bring the tracing stylus into contact with a substantially center position of the rim in the front-to-rear with of the rim.

According to the invention, when measuring a high-curve frame in which a bevel groove is formed to be deviated to the front side of a rim rather than to be in the center of a front-to-rear width thereof, assistance of an operator is reduced as much as possible to be able to achieve efficiency of measurement.

DESCRIPTION OF EXEMPLARY EMBODIMENTS

Figure 1:
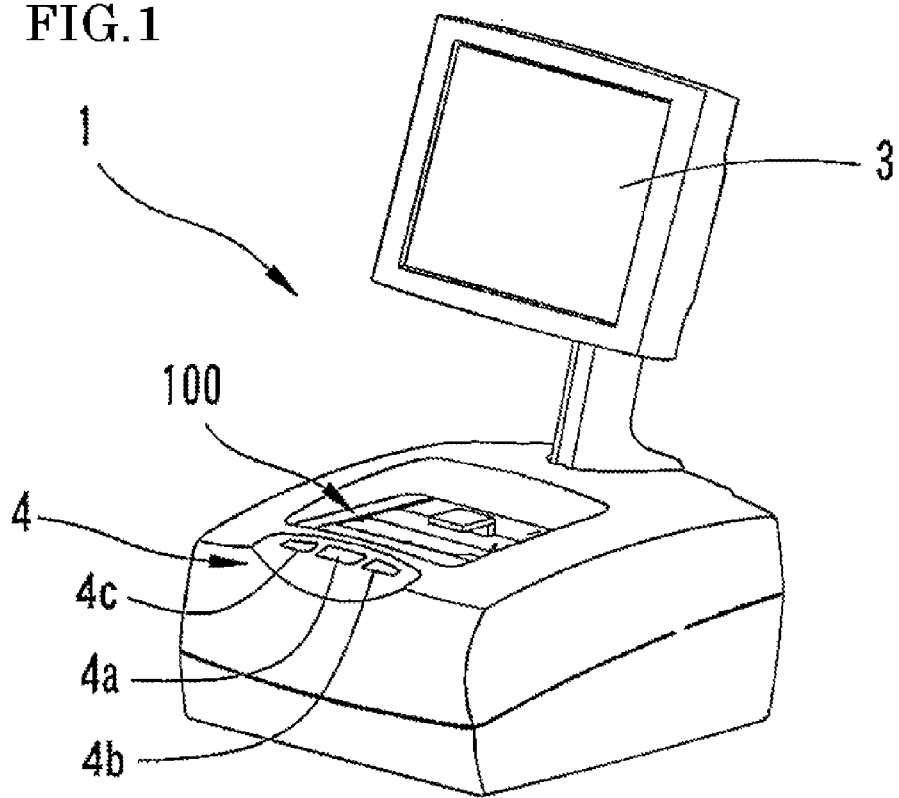
FIG. 1 is a schematic view illustrating the appearance of an eyeglass frame shape measuring apparatus.

Hereinafter, an embodiment of the present invention will be described based on views. FIG. 1 is a schematic view illustrating the appearance of an eyeglass frame shape measuring apparatus. The eyeglass frame shape measuring apparatus 1 includes a frame holding unit 100 which holds an eyeglass frame F in the desired state, and a measurement unit 200 to measure a three-dimensional shape (target lens shape) of a rim by inserting a tracing stylus into a groove (bevel groove) of the rim of an eyeglass frame held in the frame holding unit 100 and detecting a movement of the tracing stylus.

A switch portion 4 is disposed in the apparatus 1. The switch portion 4 includes a switch 4a to start the measurement in a mode in which left and right rims are consecutively measured, a switch 4b to start the measurement in a mode in which the right rim is individually measured, and a switch 4c to start the measurement in a mode in which the left rim is individually measured. The switches 4a, 4b and 4c are switches serving as selection means for selecting the respective modes.

A panel portion 3 having a touch panel-type display is disposed on a rear side of a casing of the apparatus 1. When processing a circumferential edge of a lens, layout data of a lens with respect to target lens shape data, processing conditions of the lens, and the like can be input using the panel portion 3. The three-dimensional shape data of the rim obtained through the apparatus 1 and the data input through the panel portion 3 are transmitted to a processing apparatus of a circumferential edge of an eyeglass lens. Further, similar to JP-A-2000-314617, the apparatus 1 may be configured to be built in the processing apparatus of a circumferential edge of an eyeglass lens.

Figure 2:
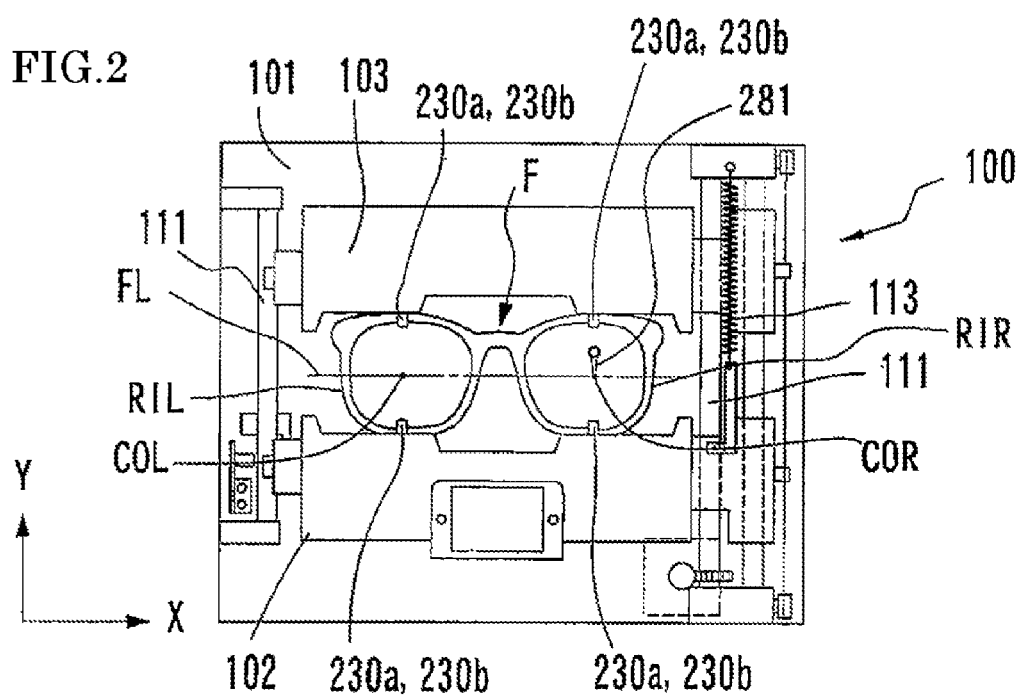
FIG. 2 is a top view of a frame holding unit.

FIG. 2 is a top view of the frame holding unit 100 in which the eyeglass frame F is held. The measurement unit 200 is provided in a lower side of the frame holding unit 100. Above a holding portion base 101, a first slider 102 and a second slider 103 are placed to hold the eyeglass frame F (right rim RIR and left rim RIL) in a substantially horizontal manner (including a case where the height of an upper side and the height of a lower side of the rim are different from each other by approximately 10 mm) The first slider 102 has a surface abutting on the lower side of the left rim RIL and the right rim RIR of the frame F in the longitudinal direction. The second slider 103 has a surface abutting on the upper side of the left rim RIL and the right rim RIR in the longitudinal direction.

The first slider 102 and the second slider 103 are slidably disposed on two rails 111 so as to face each other having the center line FL in the center in the X direction, while being continuously pulled in a direction toward the center line FL of the both sliders by a spring 113.

In the first slider 102, as a holding mechanism to hold the lower side of the left rim RIL and the right rim RIR (upper and lower side of rim denote upper and lower side in longitudinal direction when eyeglasss are worn), clamping pins 230a and 230b are respectively disposed at two places to clamp the left and right rims from the thickness direction (front side and rear side when eyeglasss are worn) of the rim. Similarly, also in the second slider 103, as a holding mechanism to hold the upper side of the left rim RIL and the right rim RIR, the clamping pins 230a and 230b are respectively disposed at two places to clamp the rims from the thickness direction of the rim. As a configuration of the frame holding unit 100, for example, a well-known description of JP-A-2000-314617 can be used.

Figure 3:
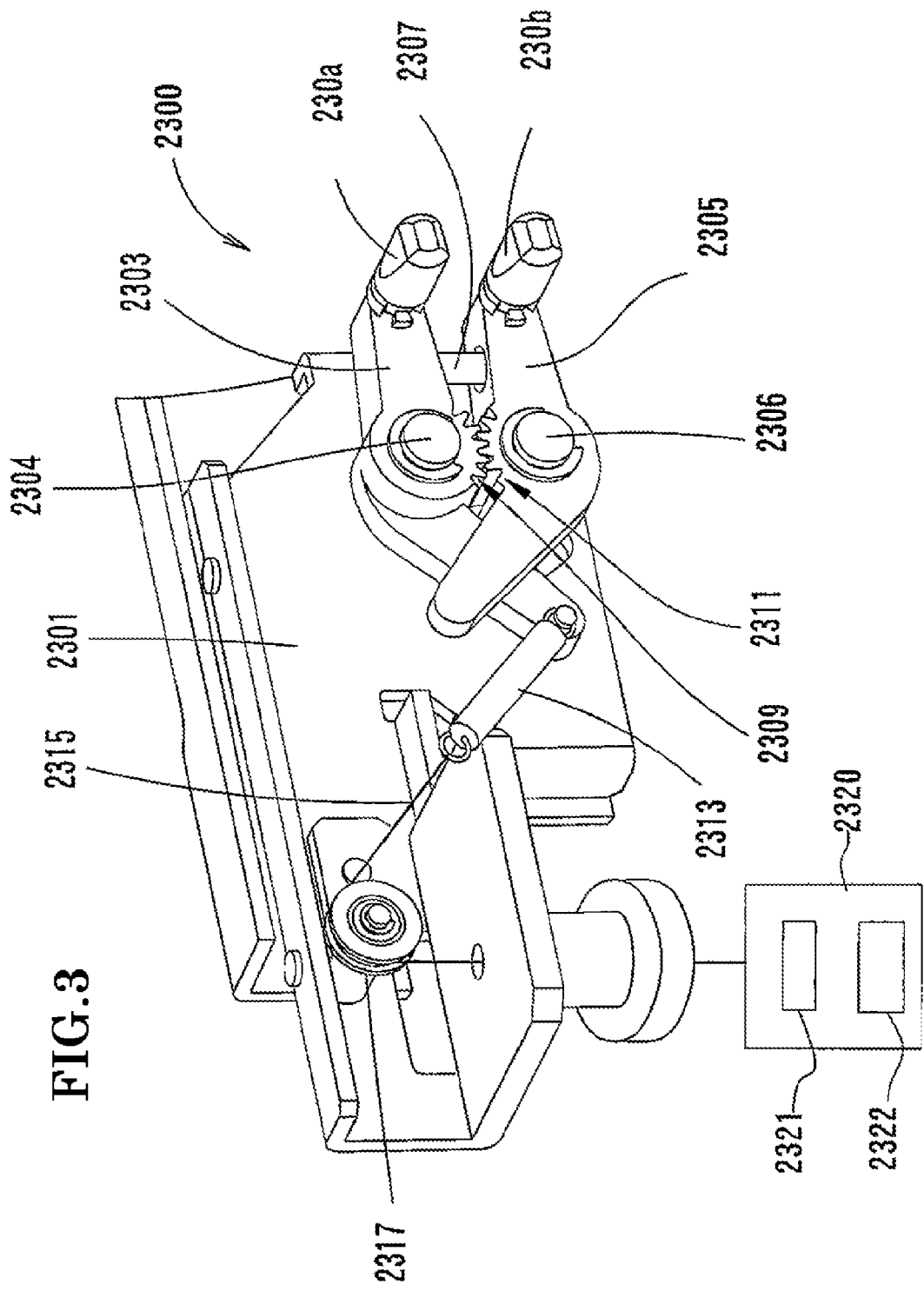
FIG. 3 is a schematic configuration view of a clamping mechanism.

FIG. 3 is a schematic configuration view of a clamping mechanism 2300 disposed on a right side of the first slider 102 to clamp the lower side of the left rim RIL. A base plate 2301 is disposed inside the first slider 102. The clamping pin 230a is attached to the tip of a first arm 2303. A center portion of the first arm 2303 is rotatably held with respect to the base plate 2301 by a rotational shaft 2304. The clamping pin 230b is attached to the tip of a second arm 2305. A center portion of the second arm 2305 is rotatably held with respect to the base plate 2301 by a rotational shaft 2306. A compression spring 2307 is attached between the first arm 2303 and the second arm 2305. A space between the two clamping pins 230a and 230b is continuously biased in the opening direction by the compression spring 2307. In addition, a gear 2309 is formed about the rotational shaft 2304 in the center portion of the first arm 2303. Similarly, a gear 2311 is formed about the rotational shaft 2306 in the center portion of the second arm 2305 such that the gear 2309 is engaged with the gear 2311.

An end of a spring 2313 is attached to a rear end of the first arm 2303. A wire 2315 is fixed to the other end of the spring 2313. The wire 2315 is connected to a driving unit 2320 via a pulley 2317 which is rotatably attached to the base plate 2301. The driving unit 2320 has a shaft 2321 to wind the wire 2315 and a motor 2322 to rotate the shaft 2321. If the wire 2315 is pulled by driving the motor 2322, the first arm 2303 is rotated clockwise about the rotational shaft 2304. At this time, since the gear 2309 is engaged with the gear 2311, the second arm is rotated counterclockwise about the rotational shaft 2306. In this manner, the two clamping pins 230a and 230b are interconnectedly closed such that the rim RIL is clamped by the two clamping pins 230a and 230b.

The clamping mechanism, which is disposed on the left side of the first slider 102 to clamp the lower side of the right rim RIR, is configured in a horizontally inverted manner with respect to the above-mentioned clamping mechanism 2300. In addition, the clamping mechanism, which is disposed on two places of the left side and the right side of the second slider 103 to clamp the upper side of the left rim RIL and the right rim RIR, has the same configuration in an inverted manner in the longitudinal direction with respect to the clamping mechanism 2300 disposed on the first slider 102. Therefore, descriptions for the other clamping mechanism will not be repeated. Meanwhile, the motor 2322 and the shaft 2321 may be configured to be respectively disposed in the clamping mechanism 2300 at four places. However, the motor 2322 and the shaft 2321 may be configured to be commonly used by the clamping mechanism 2300 at four places. In both cases, the clamping pins 230a and 230b at four places are configured to be opened and closed at the same time.

Figures 4, 5:
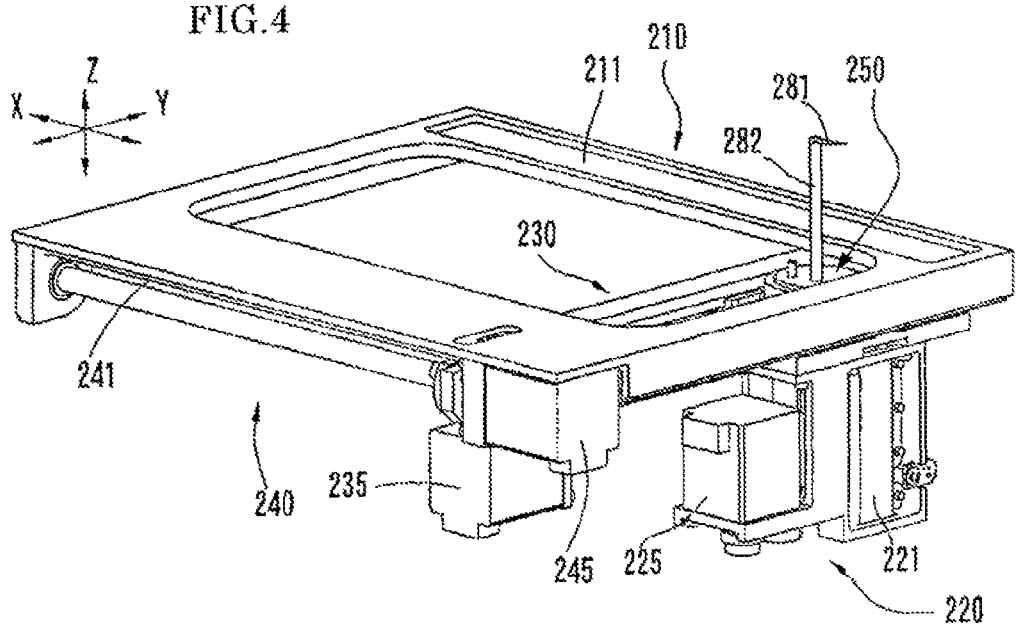
FIG. 4 is a schematic configuration view of a movement unit.
FIG. 5 is an overall perspective view of a tracing stylus holding unit.

FIGS. 4 to 7 are configuration views of the measurement unit 200. FIG. 4 is a schematic configuration view of a movement unit 210. The measurement unit 200 includes a base portion 211 which has a square-shaped frame stretched in the horizontal direction (XY direction), a tracing stylus 281 which is inserted into a bevel groove of the rims (RIL and RIR), the movement unit 210 in which the tracing stylus 281 moves along the bevel groove of the rim. The base portion 211 is disposed under the frame holding unit 100. The movement unit 210 has a tracing stylus holding unit 250 holding a tracing stylus shaft 282 to which the tracing stylus 281 is attached at an upper end thereof, a Y movement unit 230 moving the tracing stylus holding unit 250 in the Y direction, an X movement unit 240 moving the Y movement unit 230 in the X direction, and a Z movement unit 220 moving the tracing stylus holding unit 250 in the Z direction vertical to the XY direction. A radial direction of the rim is set in the XY direction when tracing the rim and the vertical direction of a radial direction is set in the Z direction.

The Y movement unit 230 includes a guide rail extending in the Y direction so as to move the tracing stylus holding unit 250 in the Y direction along the guide rail by driving a motor 235. The X movement unit 240 includes a guide rail 241 extending in the X direction so as to move the Y movement unit 230 in the X direction by driving a motor 245. The Z movement unit 220 is attached to the Y movement unit 230 so as to move the tracing stylus holding unit 250 in the Z direction along a guide rail 221 extending in the Z direction by driving a motor 225.

The configuration of the tracing stylus holding unit 250 will be described based on FIGS. 5 to 7. The tracing stylus holding unit 250 movably holds the tracing stylus shaft 282 in the vertical direction (Z direction), while including a vertical tilt holding unit (hereinafter, referred to as VH unit) 280 which tiltably holds the tracing stylus shaft 282 in the tip direction (hereinafter, referred to as direction H) of the tracing stylus 281, and a rotation unit 260 which rotates the VH unit 280 about a shaft LO extending in the Z direction about the fulcrum set under the tracing stylus shaft 282. The tracing stylus 281 has a needle-shaped tip. In the embodiment, in order to increase strength of the tracing stylus 281, the tracing stylus 281 is formed in a shape gradually tapering to the tip. In addition, a tip portion 281a of the tracing stylus 281 is formed in a spherical shape. The radius of the spherical shape of the tip portion 281a has a size which can be inserted into the groove of an ordinary lens frame, thereby being preferably 0.3 to 0.5 mm. Accordingly, even in a case where the rim is highly curved, or the rim is highly tilted (20 degrees or more) in the Z direction, the tip portion 281a is easily inserted into the bevel groove of the rim.

FIG. 5 is an overall perspective view of the tracing stylus holding unit 250. The rotation unit 260 includes a rotation base 261 which holds the VH unit 280, a motor 265 which rotates the rotation base 261. The rotation base 261 holding the VH unit 280 is rotatably held by a Z movement support base 222 about the shaft LO extending in the Z direction. The Z movement support base 222 is guided by the guide rail 221 illustrated in FIG. 4 so as to move in the Z direction by driving the motor 225. The rotation base 261 rotates about the shaft LO via a rotation transmitting mechanism such as a gear by driving the motor 265. A rotation angle of the rotation base 261 is detected by an encoder 266 attached to the rotational shaft of the motor 265. In addition, in a case where a pulse motor is used as the motor 265, the rotation angle of the rotation base 261 is controlled (managed) by the number of driving pulses of the motor 265.

Figure 6:
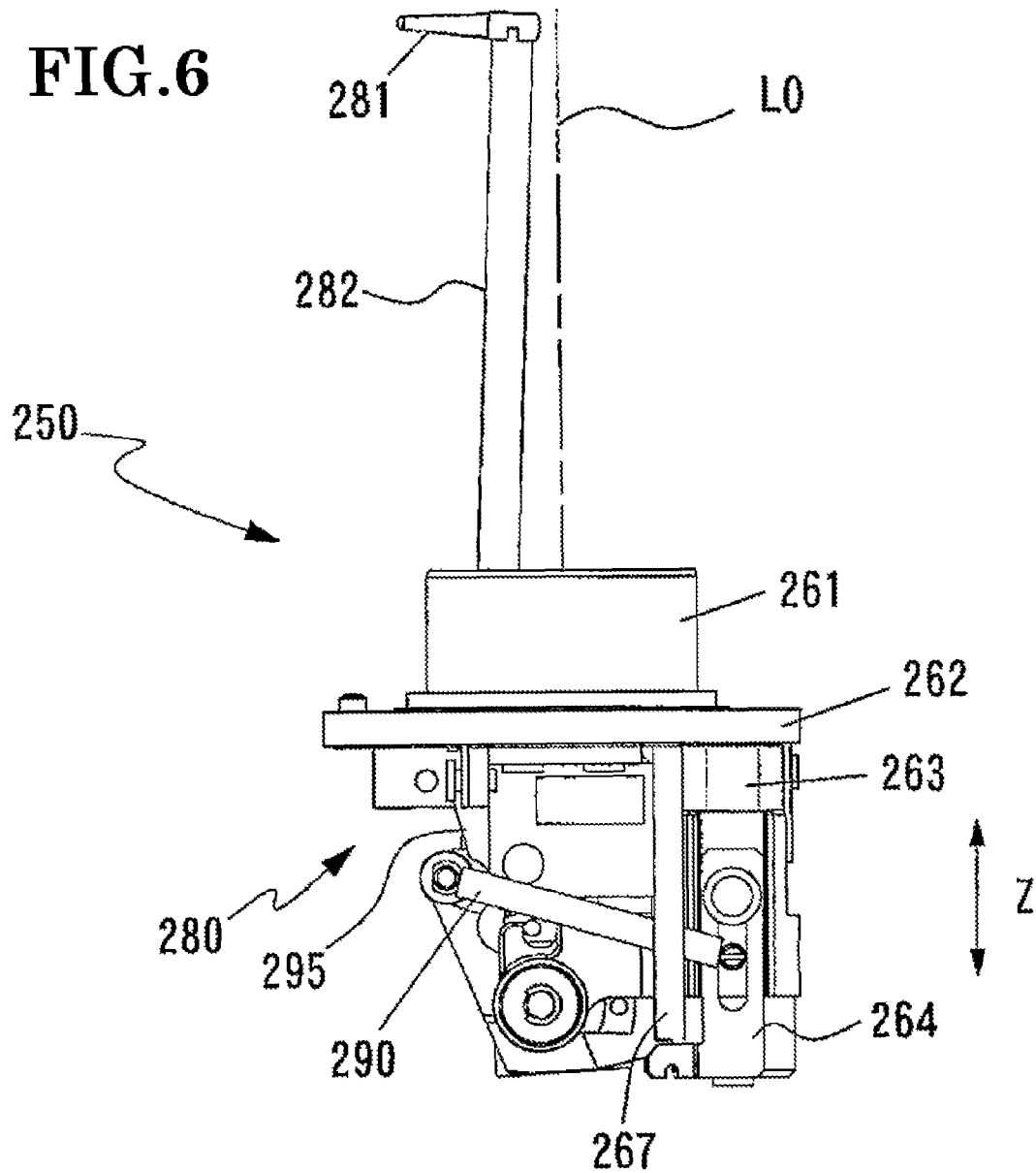
FIG. 6 is an explanatory view of a configuration of a vertical tilt holding unit.
Figure 7:
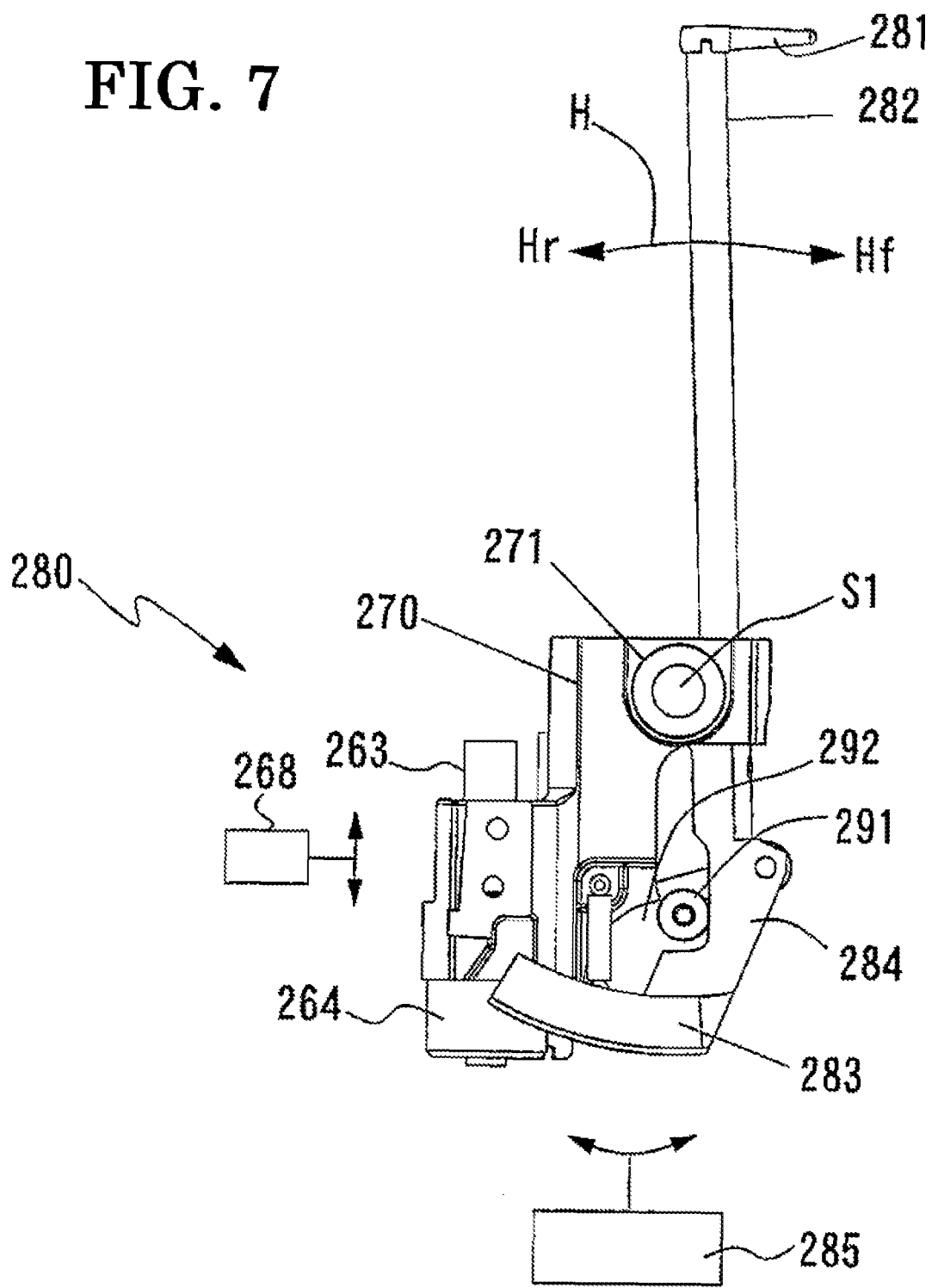
FIG. 7 is an explanatory view of a configuration of the vertical tilt holding unit.

FIGS. 6 and 7 are explanatory views of the configuration of the VH unit 280. A guide shaft 263 extending in the Z direction is fixed on the lower surface of a flange 262 which is integrally formed with the rotation base 261. FIG. 7 is an explanatory view of the VH unit 280 from which the rotation base 261 and the flange 262 are removed, and is an explanatory view of the VH unit 280 viewed from the rear side of the sheet, with respect to FIG. 6.

A Z movement support base 270 (see FIG. 7) of the VH unit 280 is fixed to a cylindrical member 264 passing through the guide shaft 263. The VH unit 280 is movably held in the Z direction along the guide shaft 263 via the Z movement support base 270 and the cylindrical member 264. The movable range of the VH unit 280 toward the Z direction is 4 mm, for example. The tracing stylus holding unit 250 includes a spring (bias member) 267 which reduces the load of the VH unit 280, and applies a moving force to cause the VH unit 280 (tracing stylus 281 and tracing stylus shaft 282) to face the upper direction (rear side direction of rim) with a small force. For example, the spring 267 is provided between the flange 262 and the cylindrical member 264. In the embodiment, the spring 267 is configured to apply a moving force to cause the VH unit 280 to face the upper direction. However, the spring 267 may be configured to apply a moving force to cause the VH unit 280 to face the lower direction (front side direction of rim). A movement position (movement position in the Z direction with respect to the rotation base 261) of the VH unit 280 in the Z direction is detected by an encoder 268, which is a position detector (see FIG. 7).

The tracing stylus shaft 282 is tiltably held about a shaft S1 (fulcrum) in the H direction via a bearing 271 held in an upper portion of the Z movement support base 270. A rotation angle detecting plate 283 is attached to a lower portion of the tracing stylus shaft 282 via an attachment member 284. A tilt angle (rotation angle) of the tracing stylus shaft 282 about the shaft S1 in the H direction is detected via the rotation angle detecting plate 283 by an encoder 285 which is a rotation angle detector.

In order to limit a tilt of the tracing stylus 281 toward the tip direction Ff, as in FIG. 7, a limiting member 291 abutting on a left end of the attachment member 284 is attached to a plate 292 of the Z movement support base 270. In addition, as illustrated in FIG. 6, a spring (bias member) 290 as a measurement pressure adding mechanism to add a measurement pressure in the tip direction of the tracing stylus 281 is disposed between the attachment plate 284 and the cylindrical member 264. The tracing stylus shaft 282 is continuously biased by a biasing force (measurement pressure) so as to tilt in the tip direction Hf of the tracing stylus 281 by the spring 290. In the initial state where the rim is yet to be measured (state where the tracing stylus 281 is yet to be brought into contact with rim), a tilt of the tracing stylus shaft 282 is limited in a state as in FIG. 7 by the attachment member 284 abutting on the limiting member 291. The initial state is a state where the tracing stylus shaft 282 is tilted as much as a predetermined angle (2 degrees) in the direction Hr which is opposite to the tip direction Hf of the tracing stylus 281 with respect to a Z shaft which is a vertical shaft. In addition, in the initial state, a regulating mechanism 295 (see FIG. 6) is provided in the tracing stylus holding unit 250 such that the VH unit 280 is positioned at a position of 0.5 mm away from the lower limit of the movable range in the Z direction. The regulating mechanism 295 is configured to be gradually increased in movable amount toward the upper direction in accordance with a tilt amount toward the direction Hr from the initial state of the tracing stylus shaft 282. For example, the regulating mechanism 295 has a limiting plate on which a rotation member, which is attached to the lower end of the tracing stylus shaft 282, abuts. The limiting member is formed so as to gradually change in the height at which the rotation member abuts in accordance with the tilt amount of the tracing stylus shaft 282. In this manner, as the tilt amount of the tracing stylus shaft 282 is increased, the movable range of the VH unit 280 (tracing stylus 281) toward the upper direction is widened. If the tracing stylus shaft 282 is over-tilted more than a certain degree (for example, 8 degrees or greater) in the direction Hr, the regulating mechanism 295 is released. Then, the VH unit 280 (tracing stylus 281) is in a freely movable state within the movable range in the Z direction (vertical direction).

Figure 8:
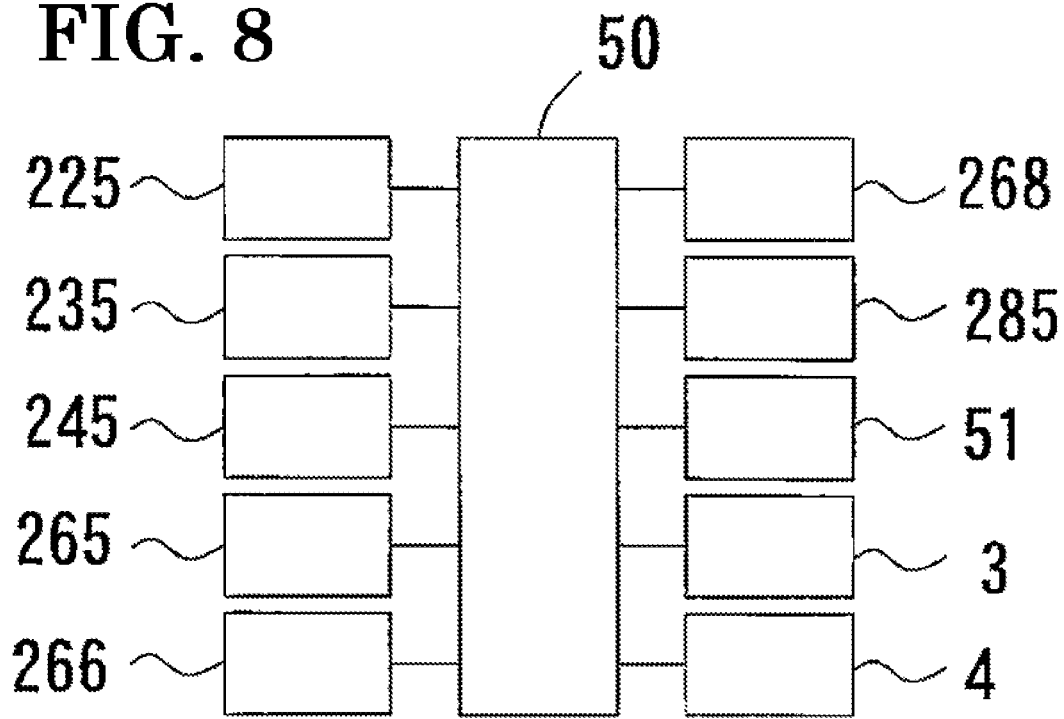
FIG. 8 is a configuration view of controlling of the apparatus.

FIG. 8 is a configuration view showing controlling of the apparatus 1. A controller 50 is connected to the motors 225, 235, 245 and 265, the encoders 268 and 285, the panel portion 3, the switch portion 4, a memory 51 which stores measurement data, and the like.

Next, an operation of the apparatus 1 having the above-mentioned configuration will be described. Firstly, a measurement operation, in a case where the bevel groove of the rim is positioned in the center of the front-to-rear width of the rim, will be described. A front side of the rim is defined as a side of the rim where the eye of the wearer is positioned, and a rear side of the rim is defined as a side of the rim opposite to the side where the eye of the wearer is positioned. As in FIG. 2, an operator causes the eyeglass frame F to be interposed between the first slider 102 and the second slider 103, and then causes each upper side and lower side of the left rim RIL and the right rim RIR to be clamped by the clamping pins 230a and 230b. The initial position of the tracing stylus 281 in the XY direction is set to a position COR (see FIG. 2) of the right rim RIR side. The X direction of the position COR is on the center line FL which is the center of the Y direction, and the Y direction of the position COR is a position where the clamping pins 230a and 230b are disposed to clamp the lower side of the right rim RIR. Further, hereinafter, a case where a mode in which the left and right rims are consecutively measured is selected by the switch 4a will be described. In the mode, if a starting signal for the measurement is input through the switch 4a, the right rim RIR and the left rim RIL are sequentially measured.

Figure 9:
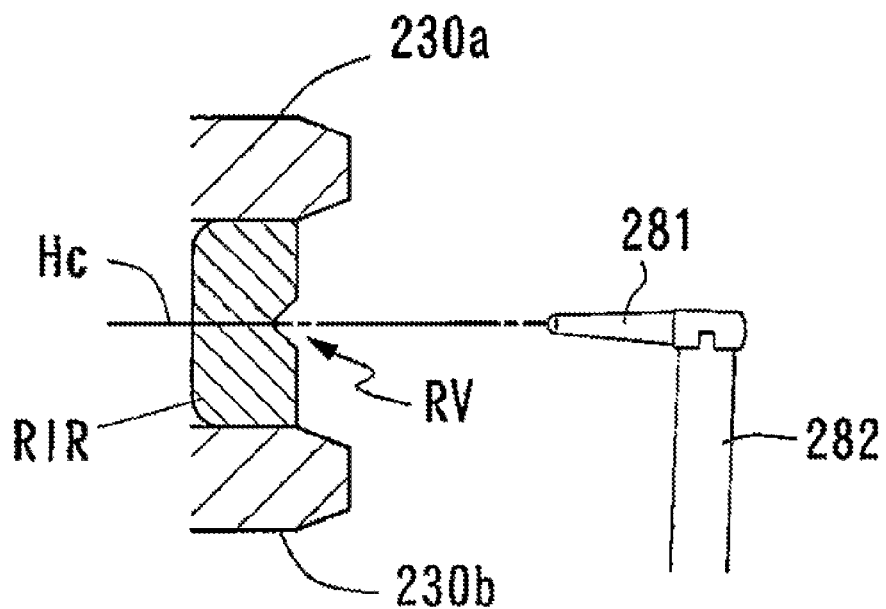
FIG. 9 is a cross-sectional view of a rim in the Z direction at a starting point of the initial measurement, and an explanatory view of a case where a bevel groove is in the center of a front-to-rear width of the rim.

The controller 50 rotates the rotation unit 260 such that the tip direction of the tracing stylus 281 faces the clamping pins 230a and 230b of the lower side of the right rim RIR in the initial position COR. In addition, as illustrated in FIG. 9, the controller 50 controls the driving of the Z movement unit 220 (motor 225), and lift the tracing stylus holding unit 250 (moved in Z direction) such that the tip of the tracing stylus 281 is positioned in a center position Hc of the clamping pins 230a and 230b. FIG. 9 is a cross-sectional view of the rim in the Z direction at the starting point of the initial measurement. Continuously, the controller 50 controls driving of the Y movement unit 230 (motor 235), and moves the tracing stylus holding unit 250 (tracing stylus 281) to the rim side such that the tracing stylus 281 positioned at the initial position COR is brought into contact with the rim. If a bevel groove RV is in the center of the front-to-rear width of the rim, the tip of the tracing stylus 281 is inserted into the bevel groove RV. Then, the tip of the tracing stylus 281 is brought into contact with the rim. Moreover, the tracing stylus holding unit 250 is moved to the rim side such that the tracing stylus shaft 282 is tilted in the direction Hr. The encoder 285 detects that the tracing stylus shaft 282 is tilted from the initial state, and the fact that the tracing stylus 281 is brought into contact with the rim is detected by the result of the detection. In the starting point of the initial measurement, the tracing stylus holding unit 250 is moved until the tracing stylus shaft 282 is tilted at a predetermined angle (8 degrees) in the direction Hr. If the tracing stylus shaft 282 is tilted at 8 degrees or greater in the direction Hr, the regulating mechanism 295 is released, and the VH unit 280 (tracing stylus 281) can be freely moved in the Z direction within a movable range in the Z direction.

In the configuration example of the measurement unit 200 of the apparatus, when measuring the rim in the radial direction, the controller 50 estimates changes in radius vector in an unmeasured part of the rim based on the information of the radius vector obtained after the measurement is started (already measured), decides the XY position to which the tracing stylus holding unit 250 moves such that the tip of the tracing stylus 281 is moved in accordance with the changes in radius vector of the unmeasured part, and controls driving of each motor of the movement unit 210 according to the decided XY position. Accordingly, the tracing stylus 281 smoothly tracks with respect to the changes in the rim such that the radius vector of the rim can be accurately measured. In addition, when measuring in the vertical direction of the rim, the controller 50 estimates changes in a Z position of unmeasured part of the rim based on information of the Z direction obtained after the measurement is started (already measured), decides the Z position to which the tracing stylus holding unit 250 moves such that the tip of the tracing stylus 281 is moved in accordance with the changes in the Z position of the unmeasured part, and controls driving of Z movement unit 220 (motor 225). Accordingly, similarly in the measurement in the Z direction, the tracing stylus 281 smoothly tracks with respect to the changes in the rim such that the Z position of the rim can be accurately measured. In addition, as the Z position of the rim becomes higher, the controller 50 controls the movement unit 210 such that the tilt angle toward the direction Hr of the tracing stylus shaft 282 becomes larger. Accordingly, when measuring a high-curve frame, the tracing stylus 281 is reduced in possibility of derailing from the bevel groove of the rim, thereby making it possible to perform the measurement.

At the starting point of the initial measurement, the controller 50 recognizes the radius vector of the rim to be changed in the X direction, and moves the tracing stylus holding unit 250 in the X direction such that the tracing stylus 281 is moved in the X direction of the ear side (side where the ear of the wearer who wears the frame is positioned). Then, if the tip of the tracing stylus 281 is moved to track the changes in radius vector of the rim, the tracing stylus shaft 282 is tilted. The tilt angle of the tracing stylus shaft 282 is detected by the encoder 285 such that information of the XY position at the tip of the tracing stylus 281 with respect to a reference position of the tracing stylus holding unit 250 can be obtained. When the information of the radius vector in a predetermined number of measurement points (for example, 5 points out of 1,000 points in total to be measured) from the starting point of the measurement is obtained, the controller 50 estimates the changes in following measurement points (unmeasured points). Then, based on the result thereof, the tracing stylus holding unit 250 is moved in the XY direction such that the tracing stylus 281 follows the rim RIR. In addition, the controller 50 controls driving of the motor 265 to rotate the VH unit 280 about the shaft LO by rotating the rotation base 261. The rotation angle at the moment is decided such that the tip direction of the tracing stylus 281 is in the normal direction with respect to the estimated changes in radius vector of the rim. Otherwise, the rotation angle may be decided in the intermediate direction between the radius vector angle about the position COR and the normal direction. The information of the radius vector (measurement data) of the whole circumference of the rim can be obtained by repeating the operation. Further, the information of the XY position at the tip of the tracing stylus 281 with respect to the reference position of the tracing stylus holding unit 250 can be obtained through the detected information of the encoder 285 and the rotational information of the VH unit 280. The information of the radius vector (measurement data) of the rim can be obtained by the information of the XY position and the driving information of the motor 235 and 245 which cause the tracing stylus holding unit 250 to make a XY-movement.

After the measurement of the rim is started, the tracing stylus 281 and the tracing stylus shaft 282 are moved in the Z direction tracking the changes in the rim toward the Z direction. The movement position of the tracing stylus shaft 282 in the Z direction is detected by the encoder 268 and the Z directional components of the encoder 285, thereby making it possible to obtain the information of the Z position of the tracing stylus 281 with respect to the reference position of the tracing stylus holding unit 250. The information of the Z position (measurement data) of the rim can be obtained by the information of the Z position and the driving information of the motor 225 which causes the tracing stylus holding unit 250 to make a Z-movement.

Figure 10:
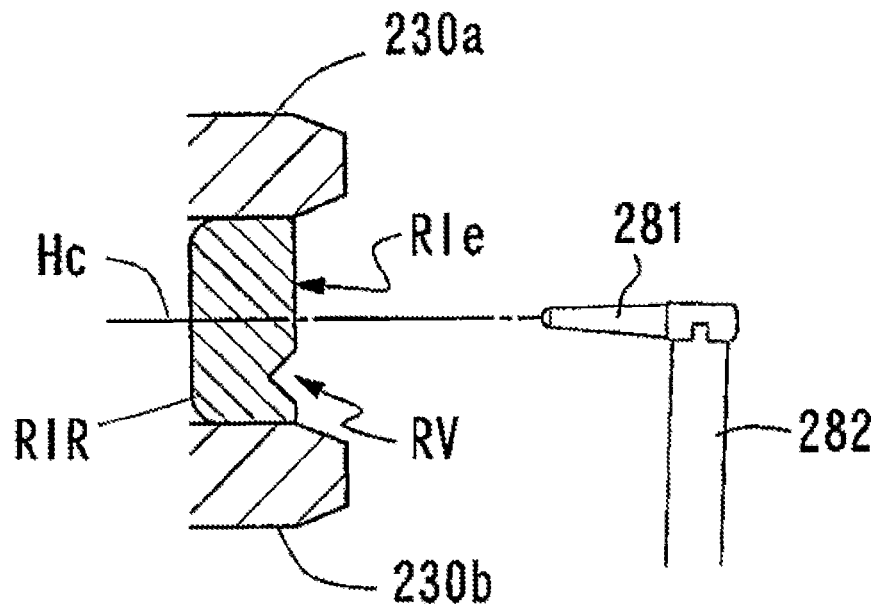
FIG. 10 is a cross-sectional view of the rim in the Z direction at the starting point of the initial measurement, and an explanatory view of a case where the bevel groove RV is formed to be deviated to a front side with respect to the center of the front-to-rear width of the rim.

Next, as in FIG. 10, a measurement operation will be described in which the bevel groove RV of the rim is formed to be deviated to the front side of the rim with respect to the center of the front-to-rear width of the rim. FIG. 10 is a cross-sectional view of the rim in the Z direction at starting point of the initial measurement. As described above, if the starting signal for the measurement is input, the controller 50 moves the tracing stylus 281 positioned in the center position He at the initial position COR to the rim side. If the fact that the tracing stylus 281 is brought into contact with the rim is detected, the controller 50 moves the tracing stylus 281 in the ear side direction or the nose side direction which are the X directions (nose side: a side where a nose of the wearer who wears the frame is positioned). However, since the bevel groove RV is not positioned in the center position He of the clamping pins 230a and 230b, the tracing stylus 281 is not inserted into the bevel groove RV so as to be moved in the X direction while being brought into contact with an inner wall RIe of the rim. Here, since a force by which the VH unit 280 (tracing stylus 281) faces an upper direction (rear side direction of the rim) of the width direction of the rim is applied by the spring 267, the tracing stylus 281 is moved to the upper direction along the inner wall RIe of the rim, thereby derailing from the rim to cause a measurement failure. Further, even in a case where a force by which the VH unit 280 (tracing stylus 281) faces the front side direction of the rim is applied to the spring 267, the tracing stylus 281 is inserted into the bevel groove RV during the movement or derailed from the rim, thereby causing the measurement failure.

A measurement failure caused by starting the measurement without having the tracing stylus 281 inserted into the bevel groove RV at the starting point of the initial measurement can be decided based on whether or not an abrupt change (abnormal data considered to be non-continuous) is present in measurement data obtained within a predetermined radius vector range RS (not illustrated) from the starting point of the initial measurement. That is, when the measurement is started in a state where the tracing stylus 281 is inserted into the bevel groove RV, the measurement data of the radial direction and the Z direction is consecutively and gradually changed. In contrast, if the measurement is started in a state where the tracing stylus 281 is not inserted into the bevel groove RV and brought into contact with the inner wall RIe of the rim such that the tracing stylus 281 is derailed (or inserted into the bevel groove RV) from the rim during the measurement as described above, an abrupt change is present in at least one of measurement data of the radial direction and the Z direction.

For example, the controller 50 decides that the measurement failure is present in a case where the radius vector length of the measurement data is changed by 1 mm or more among the measurement points with the 0.36 degree intervals on the basis of the position COR. In addition, the controller 50 decides that the measurement failure is present in a case where the Z position of the measurement data is changed by 0.3 mm or more from three points behind (position of 1.08 degree retraced). Decision of the measurement failure is set within a predetermined radius vector range RS from the starting point of the initial measurement (for example, a range of 36 degrees from the starting point of the initial measurement or a range of 10 mm toward the X direction from the starting point of the initial measurement on the basis of the position COR).

When the controller 50 decides that a failure is present in the measurement within a predetermined radius vector range RS from the starting point of the initial measurement as described above, the controller 50 determines that a measurement failure, which is caused by starting the measurement in a state where the tracing stylus 281 is not inserted into the bevel groove RV at the starting point of the initial measurement, is present. Then, the controller 50 suspends the measurement for the moment, thereby automatically shifting to a remeasurement mode.

Remeasurement mode will be described. At the remeasurement, the controller 50 changes at least a part of the movement operation regarding the movement control of the tracing stylus 281 when the remeasurement is started in a state that the tracing stylus 281 is inserted into the bevel groove RV of the rim at the measurement starting point. For example, the controller 50 returns the tracing stylus 281 back to the initial position COR for the moment, and then moves the tracing stylus 281 to the rim side, similar to the initial measurement operation. If the fact that the tracing stylus 281 is brought into contact with the rim is detected by the encoder 285, the controller 50 moves the tracing stylus holding unit 250 such that the tracing stylus shaft 282 is tilted within a range where the movement of the tracing stylus 281 in the Z direction is regulated by the regulating mechanism 295. For example, the tracing stylus holding unit 250 is moved to the rim side such that the tracing stylus shaft 282 is tilted in the direction Hr from the initial state until the tilt amount (for example, 5 degrees) becomes smaller than the tilt amount of the tracing stylus shaft 282 (8 degrees) at which the regulating of the regulating mechanism 295 is completely released. In this state, movable amount of the VH unit 280 (tracing stylus 281) to the Z direction (vertical direction) is limited up to 2 mm in the upper direction from the lower limit. In this manner, the position of the tracing stylus 281, which is brought into contact with the inner wall Pie of the rim, in the Z direction is substantially maintained in the center position of the front-to-rear width of the rim. Then, the controller 50 controls driving of the movement unit 210 in a state where the position of the tracing stylus 281 in the Z direction is substantially maintained, and then moves the tracing stylus holding unit 250 (tracing stylus 281) to the ear side direction of the rim from the starting point of the initial measurement. Otherwise, the controller 50 controls driving of the motor 225 and moves the tracing stylus holding unit 250 to the lower direction (front direction of the rim) such that the position of the tracing stylus 281 in the Z direction faces the front side direction of the rim, while causing the tracing stylus holding unit 250 (tracing stylus 281) to move to the ear side direction of the rim from the starting point of the initial measurement.

Figure 11:
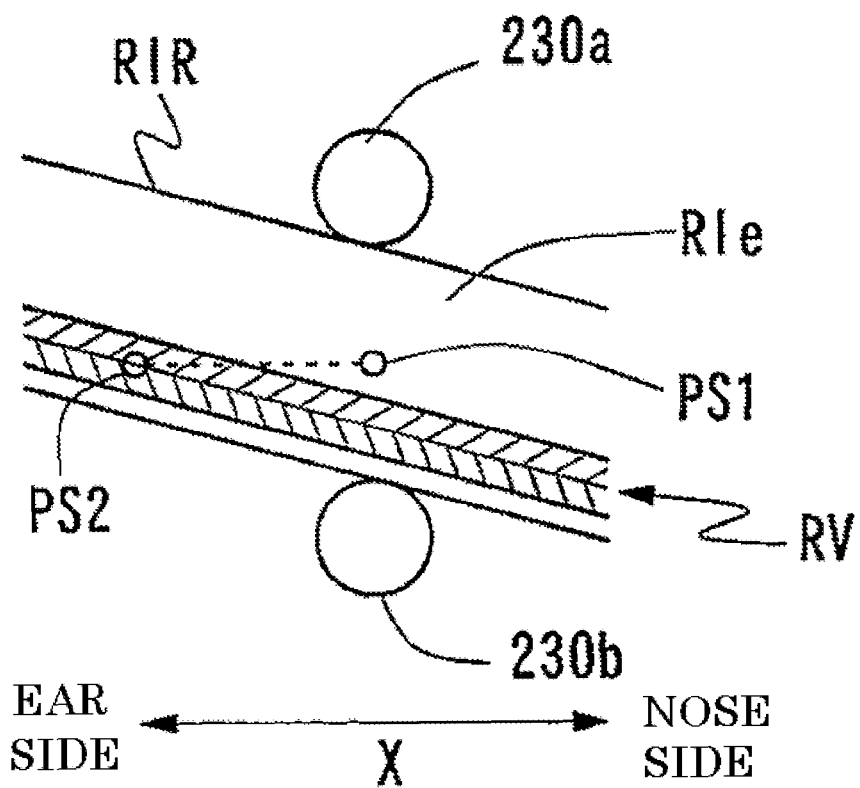
FIG. 11 is a view of the rim viewed from the initial position COR, and the view illustrates a tilt state of the rim and the bevel groove.

Here, the rim and the bevel groove RV of an ordinary high-curve frame F held in the frame holding unit 100 is, as illustrated in FIG. 11, gradually lifted toward the ear side direction of the rim RIR. Therefore, if the tracing stylus 281 is moved to the ear side direction of the rim in the X direction, the tracing stylus 281 is inserted into the bevel groove RV any time. FIG. 11 is a view of the rim viewed from the initial position COR, and the view illustrates the tilt state of the rim and the bevel groove RV. In the FIG. 11, PS I denotes the tip position of the tracing stylus 281 at the starting point of the initial measurement, and PS2 denotes a position where the tracing stylus 281 is inserted into the bevel groove RV.

As in FIG. 11, the measurement data (information of radius vector) of the respective measurement points, through which the tracing stylus 281 is moved while being brought into contact with the inner wall RIe of the rim, is gradually changed. However, if the tracing stylus 281 is inserted into the bevel groove RV from the contact position of the inner wall RIe, the information of the radius vector for the measurement data is abruptly changed. The controller 50 determines that the stage where an abrupt change is present in the information of the radius vector is the position where the tracing stylus 281 is inserted into the bevel groove RV during the measurement. Further preferably, the position PS2 is determined based on whether or not the information of the radius vector and the information of the Z position in the Z direction are gradually changed, after an abrupt change is present in the information of the radius vector. Then, when the controller 50 determines that the tracing stylus 281 is inserted into the bevel groove RV during the measurement, the controller 50 does not employ the measurement data (does not employ the data as the result of the measurement) from the starting point of the initial measurement PS1, thereby starting to newly obtain the measurement data.

For example, the controller 50 controls the movement unit 210 so as to return the tracing stylus 281 along the bevel groove RV from the position PS2 where the tracing stylus 281 is inserted into the bevel groove RV to the starting point of the initial measurement (position of the clamping pins 230*a* and 230*b*), and controls the movement unit 210 so as to obtain the measurement data of the whole circumferential shape of the rim by causing the tracing stylus 281 to move again from the starting point of the initial measurement to the ear side direction or the nose side direction of the rim.

After the determining that the tracing stylus 281 is inserted into the bevel groove RV during the measurement, the measurement may be performed as follows. The controller 50 employs the position PS2 where the tracing stylus 281 is inserted into the bevel groove RV as the new starting point of the measurement, moves the tracing stylus 281 along the change of the bevel groove RV, and controls the movement unit 210 so as to obtain the measurement data of the whole circumference of the rim. Further, if the tracing stylus 281 is inserted into the bevel groove RV of the rim, the movement direction of the tracing stylus 281 may be any one of the ear side direction or the nose side direction of the rim.

At the remeasurement, after the controller 50 separates the tracing stylus 281 from the rim if the tracing stylus is moved again toward the rim side, the controller 50 may controls the movement unit 210 so that the tracing stylus 281 contacts a position of the rim which is located a predetermined distance front (for example 1 mm) from a center position of the rim in the front and rear direction, instead of contacting the center position. In this case, for the high-curve frame in which the bevel groove is formed to be deviated to the front side of the time, the tracing stylus 281 is inserted into the bevel groove RV at the measurement starting point of the remeasurement with high probability.

The measurement data of the whole circumference of the right rim RIR is stored in a memory 51 (storing means). If the measurement of the right rim RIR is completed, the controller 50 controls the movement unit 210 to consecutively measure the left rim RIL and moves the tracing stylus 281 to the initial position COL (position set in the same manner as the position COR at the right rim RIR side) set at the left rim RIL side. Then the controller 50 moves the tracing stylus 281 to the starting point of the measurement of the left rim RIL from the initial position COL. At this time, the controller 50 does not set the position of the tracing stylus 281 in the Z direction to the center position Hc of the clamping pins 230*a* and 230*b*, but decides the Z direction position (position in the front and rear direction of the rim) of the tracing stylus 281 when the tracing stylus is moved toward the rim side based on the measurement data of the right rim RIR, which is stored in the memory 51. That is, the controller 50 reads out the Z direction position data at the position (initial measurement point of the radius vector) where the right rim RIR is clamped by the clamping pins 230*a* and 230*b* from the memory 51, thereby causing the tracing stylus 281 to move in the Z direction position likewise. In this manner, when the tracing stylus 281 is moved to the starting point of the initial measurement (position of clamping pins 230*a* and 230*b*) of the left rim RIL, the tracing stylus 281 is inserted into the bevel groove RV with a high probability of success from the first. If the tracing stylus 281 is inserted into the bevel groove RV at the starting point of the initial measurement, the whole circumference of the rim is measured under the normal measurement operation.

Also in measuring the left rim RIL, if the tracing stylus 281 is not inserted into the bevel groove RV at the starting point of the initial measurement, and if an abrupt change is present in the measurement data within the radius vector range RS, the controller 50 decides that the tracing stylus 281 is not inserted into the bevel groove RV so as to cause the measurement failure at the starting point of the measurement, thereby performing the same control as in the right rim RIR. The sequential order of measurement in the right rim RIR and the left rim RIL is not limited thereto such that the left rim RIL may be measured in advance.

Meanwhile, even in a case where the bevel groove RV is formed to be deviated to the front side rather than the center of a front-to-rear width of the rim, assistance of an operator is not necessary such that the measurement data of the whole circumferential shape of the rim in a state where the tracing stylus 281 is inserted into the bevel groove RV can be automatically obtained. Accordingly, it is possible to achieve efficiency of measurement.

The above-mentioned embodiment mainly describes the configuration in which a moving force is applied to the tracing stylus 281 brought into contact with the inner wall RIe of the rim to cause the tracing stylus 281 to face the upper direction (rear side direction of the rim). However, a configuration, in which a moving force is applied to the tracing stylus 281 to face the lower direction (front side direction of the rim), may be employed.

In a case of the configuration in which a moving force is applied to the tracing stylus 281 to face the lower direction (front side direction of the rim), the tracing stylus 281 is brought into contact with the inner wall RIe of the rim, and then the tracing stylus 281 faces the lower direction (front side of the rim). Therefore, the tracing stylus 281 is inserted into the bevel groove RV which is positioned in the lower direction (front side of the rim) from the starting point of the initial measurement of the tracing stylus 281 with a high probability of success. Accordingly, in a remeasurement operation after deciding that the measurement failure is present when starting the measurement, an operation to separate the above-mentioned tracing stylus 281 from the rim for the moment and insert the tracing stylus 281 into the bevel groove RV again is unnecessary. Determining whether or not the tracing stylus 281 is inserted into the bevel groove RV is performed based on at least one of the measurement data obtained when it is first decided that the measurement failure is present and the measurement data obtained thereafter.

For example, when determining the insertion status using the measurement data obtained when it is first decided that the measurement failure is present, the insertion status can be determined based on whether or not at least one of the information of the radius vector and the positional information of the Z direction which are included in the measurement data is equal to or more than a predetermined value. When the tracing stylus 281 is brought into contact with the inner wall RIe of the rim, and then the tracing stylus 281 is derailed from the rim without being inserted into the bevel groove RV, the tracing stylus 281 extendedly moves all the way to the movement limit toward the radial direction, while extendedly moving all the way to the movement limit toward the Z direction in the same manner. In contrast, if the tracing stylus 281 is inserted into the bevel groove RV, the changes in the radial direction of the tracing stylus 281 stop due to the abutting on the bevel groove RV. If the changes in the radial direction at the moment are set to be a predetermined value such as 5 mm, it is possible to determine whether or not the tracing stylus 281 is inserted into the bevel groove RV. Similarly, in the Z direction, it is possible to determine whether or not the tracing stylus 281 is inserted into the bevel groove RV depending on whether or not the moving amount of the tracing stylus 281 is equal to or more than a predetermined value such as 3 mm When using the measurement data (hereinafter, referred to as continuous measurement data) obtained after it is first decided that the measurement failure is present, determining whether or not the tracing stylus 281 is inserted into the bevel groove RV can be done based on whether or not an abrupt change is present in at least one of the information of the radius vector and the information of the vertical direction which are included in the continuous measurement data. For example, even after deciding whether or not the measurement failure is present under the above-mentioned condition, the tracing stylus 281 is continuously caused to move to the X direction, thereby determining whether or not the tracing stylus 281 is inserted into the bevel groove RV based on whether or not an abrupt change is present in the information of the radius vector and the information of the Z position within a predetermined radius vector range (for example, similar range as the above-mentioned radius vector range RS). That is, if the tracing stylus 281 is inserted into the bevel groove RV, the information of the radius vector and the information of the Z position of the continuous measurement data gradually change such that an abrupt change is no longer present.

As mentioned above, if the tracing stylus 281 can be determined to be inserted into the bevel groove RV, in the similar manner described above, the measurement data of the whole circumference of the rim can be obtained by causing the tracing stylus 281 to move in accordance with the changes in the bevel groove RV.

Even after determining that the tracing stylus 281 is inserted into the bevel groove RV, the controller 50 monitors whether or not an abrupt change is present in the measurement data. If there is any abrupt change is present, the controller 50 perceives a measurement failure and stops the measurement. In this case, an operator checks if the failure is caused due to the derailing of the tracing stylus 281 from the bevel groove RV. If the failure is caused due to the derailing of the tracing stylus 281 from the bevel groove RV, in the same manner as in the related art, the operator takes an action to insert the tracing stylus into the bevel groove with fingers, and then the operator may take a step to start the measurement of the rim.

The configuration of the measurement unit 200 is not limited to the description of FIGS. 4 to 7. Even in the similar configuration as JP-A-2000-314617, the invention can be applied. In the configuration of JP-A-2000-314617, the tracing stylus is configured to be moved in the Z direction by driving of the motor. When shifted to the remeasurement mode mentioned above, the regulating mechanism 295 described in the above-mentioned embodiment can cause the motor (motor to move the tracing stylus in the Z direction) to be switched to driving state. That is, the controller controls driving of the motor so as to cause the Z direction position of the position PS1 of the tracing stylus 281 brought into contact with the inner wall RIe of the rim as in the FIG. 11 to be substantially maintained or to face the front side of the rim, while moving the tracing stylus 281 toward the ear side direction of the rim in the X direction. Accordingly, the tracing stylus 281 is inserted into the bevel groove RV. After the tracing stylus 281 is inserted into the bevel groove RV, the measurement data from the starting point of the initial measurement PS1 is no longer employed such that the measurement data of the whole circumference of the rim can be obtained through an operation similar to the above-mentioned embodiment. Likewise, various modifications can be applied to the invention to be included in the invention.

What is claimed is:

1. An eyeglass frame shape measuring apparatus comprising:
   a frame holding unit configured to hold a rim of an eyeglass frame;
   a tracing stylus configured to be inserted into a bevel groove of the rim;
   a moving unit configured to move the tracing stylus;
   a detector configured to detect a position of the tracing stylus; and
   a controller configured to control the moving unit and obtain measurement data of a shape of the rim based on the detection result by the detector,
   wherein the controller controls the moving unit based on a first measurement operation to perform a first measurement,
   wherein the controller decides, based on a change in the measurement data obtained by moving the tracing stylus from a measurement starting point of the rim at the first measurement, whether the first measurement is performed in a first state in which the tracing stylus is inserted into the bevel groove of the rim at the time of starting the first measurement or a second state in which the tracing stylus is not inserted into the bevel groove of the rim at the time of starting the first measurement, and
   wherein if the controller decides that the first measurement is performed in the second state, the controller performs a second measurement based on a second measurement operation which is at least partially different from the first measurement operation.

2. The eyeglass frame shape measuring apparatus according to claim 1, wherein
   in the second measurement, the controller decides, based on the change in the obtained measurement data, whether or not the tracing stylus is inserted into the bevel groove during the movement of the tracing stylus, and
   the controller controls the moving unit to move the tracing stylus from a position of the rim where the controller decides that the tracing stylus is inserted into the bevel groove and obtains the measurement data of a whole circumference of the rim.

3. The eyeglass frame shape measurement apparatus according to claim 1 further comprising:
   a measurement starting signal input unit configured to input a starting signal for consecutive measurement to consecutively measure a first rim which is one of left and right rims, and then a second rim which is the other one of the left and right rims; and
   a memory for storing the measurement data of the rim,
   wherein, when the starting signal for consecutive measurement is input, after the measurement of the first rim, the controller determines a position of the tracing stylus in a front-and-rear direction of the rim when the tracing stylus is moved from an initial position to a measurement starting point of the second rim based on the measurement data of the first rim stored in the memory, and starts measuring the second rim by moving the tracing stylus to the determined position.

4. The eyeglass frame shape measurement apparatus according to claim 1, wherein in the second measurement, the controller controls the moving unit to separate the tracing stylus from the rim, then bring the tracing stylus into contact with a substantially center position of the rim in a front-torear width of the rim, and move the tracing stylus in an ear side direction of the rim while the contact position of tracing stylus with respect to the rim in the front-to-rear with of the rim is substantially kept.

5. The eyeglass frame shape measurement apparatus according to claim 1, wherein in the second measurement, the controller controls the moving unit to separate the tracing stylus from the rim, then bring the tracing stylus into contact with a substantially center position of the rim in a front-to-rear width of the rim, and move the tracing stylus in an ear side direction of the rim while the tracing stylus in a front direction of the rim is moved.

6. The eyeglass frame shape measurement apparatus according to claim 1, wherein in the second measurement, the controller controls the moving unit to separate the tracing stylus from the rim, and then bring the tracing stylus into contact with a position of the rim which is located at a front side than a center position of the rim in a front-to-rear width of the rim.

7. The eyeglass frame shape measurement apparatus according to claim 1, wherein
the controller controls the moving unit to move the tracing stylus, which is positioned at an initial position, toward the rim held by the frame holding unit, and bring the tracing stylus into contact with a substantially center position of the rim in a front-to-rear width of the rim, and
if the controller decides that the first measurement is performed in the first state, the controller controls the moving unit so as to obtain the measurement data of the whole circumference of the rim from the measurement starting point.

8. The eyeglass frame shape measurement apparatus according to claim 7, wherein
the moving unit includes a moving force applying unit configured to apply moving force for causing the tracing stylus, which contacts the rim, toward a rear direction of the rim,
if the controller decides that the first measurement is performed in the second state, the controller:
controls the moving unit to separate the tracing stylus from the rim and bring the tracing stylus into contact with the substantially center position of the rim, and move the tracing stylus in an ear side direction of the rim in a state that the contact position of tracing stylus with respect to the rim in the front-to-rear with of the rim is substantially kept;
decides, based on the change in the obtained measurement data, whether the tracing stylus is inserted into the bevel groove during the movement of the tracing stylus;
controls the moving unit to move the tracing stylus along the bevel groove from a position where the controller decides that the tracing stylus is inserted into the bevel groove; and
obtains the measurement data of a whole circumference of the rim.

9. The eyeglass frame shape measurement apparatus according to claim 7, wherein
the moving unit includes a moving force applying unit configured to apply moving force for causing the tracing stylus, which contacts the rim, toward a rear direction of the rim,
if the control unit decides that the first measurement is performed in the second state, the control unit:
controls the moving unit to separate the tracing stylus from the rim and bring the tracing stylus into contact with the substantially center position of the rim, and move the tracing stylus in an ear side direction of the rim while moving the tracing stylus in a front direction of the rim;
decides, based on the change in the obtained measurement data, whether the tracing stylus is inserted into the bevel groove during the movement of the tracing stylus;
controls the moving unit to move the tracing stylus along the bevel groove from a position where the controller decides that the tracing stylus is inserted into the bevel groove; and
obtains the measurement data of a whole circumference of the rim.

10. The eyeglass frame shape measurement apparatus according to claim 7, wherein
the moving unit includes a moving force applying unit configured to apply moving force for causing the tracing stylus, which contacts the rim, toward a rear direction of the rim,
if the controller decides that the first measurement is performed in the second state, the controller:
decides whether the tracing stylus is inserted into the bevel groove during the movement of the tracing stylus based on the change in the obtained measurement data; and
controls the moving unit to move the tracing stylus along the bevel groove from a position where the controller decides that the tracing stylus is inserted into the bevel groove; and
obtains the measurement data of a whole circumference of the rim.

11. The eyeglass frame shape measuring apparatus according to claim 7, wherein
the frame holding unit includes two clamp pins arranged to clamp front and rear sides of the rim, and
the controller controls the moving unit to bring the tracing stylus to a substantially center position between the two clamp pins to bring the tracing stylus into contact with a substantially center position of the rim in the front-to-rear with of the rim.

* * * * *